United States Patent
Sadjadi et al.

(10) Patent No.: US 11,093,761 B2
(45) Date of Patent: Aug. 17, 2021

(54) LANE POSITION SENSING AND TRACKING IN A VEHICLE

(71) Applicant: GM Global Technology Operations LLC, Detroit, MI (US)

(72) Inventors: Hossein Sadjadi, Markham (CA); Syed Ali Raza, Oshawa (CA); Matthew G. Adams, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 16/293,837

(22) Filed: Mar. 6, 2019

(65) Prior Publication Data
US 2020/0285863 A1 Sep. 10, 2020

(51) Int. Cl.
*G06K 9/00* (2006.01)
*G08G 1/16* (2006.01)
*G06T 7/70* (2017.01)

(52) U.S. Cl.
CPC ............ *G06K 9/00798* (2013.01); *G06T 7/70* (2017.01); *G08G 1/167* (2013.01); *G06T 2207/30244* (2013.01); *G06T 2207/30256* (2013.01)

(58) Field of Classification Search
CPC ...... G06K 9/00798; G08G 1/167; G06T 7/70; G06T 2207/30256; G06T 2207/30244; B60W 30/12

USPC .......................................................... 382/104
See application file for complete search history.

(56) References Cited

U.S. PATENT DOCUMENTS

| | | | |
|---|---|---|---|
| 10,490,081 B2* | 11/2019 | Shimizu | G01S 13/931 |
| 2004/0042638 A1* | 3/2004 | Iwano | G06K 9/00798 |
| | | | 382/104 |
| 2016/0025848 A1* | 1/2016 | Hole | G01S 13/753 |
| | | | 701/300 |
| 2017/0003683 A1* | 1/2017 | Sato | B62D 15/025 |
| 2017/0147889 A1* | 5/2017 | Okano | G06K 9/209 |
| 2017/0267177 A1* | 9/2017 | Nariyambut Murali | |
| | | | G06K 9/4628 |
| 2018/0053060 A1* | 2/2018 | Huang | G01S 5/16 |
| 2018/0347990 A1* | 12/2018 | Mishina | G08G 1/0968 |
| 2019/0102632 A1* | 4/2019 | Tsuchiya | G06K 9/00798 |
| 2019/0111922 A1* | 4/2019 | Nath | B60W 30/0956 |
| 2020/0193174 A1* | 6/2020 | Machii | G08G 1/16 |

* cited by examiner

*Primary Examiner* — Van D Huynh
(74) *Attorney, Agent, or Firm* — Cantor Colburn LLP

(57) ABSTRACT

A system and method to perform lane position sensing and tracking in a vehicle include using a first camera with a first field of view of a first side of the vehicle and a second camera with a second field of view on a second side of the vehicle to capture images. The method includes determining if a first lane line on a first side of the vehicle and a second lane line on the second side of the vehicle are both visible, and based on the first lane line and the second lane line being visible, determining, a position of the vehicle in a lane between the first lane line and the second lane line and determining a trajectory of the first lane line and the second lane line and of the vehicle.

20 Claims, 3 Drawing Sheets

LANE POSITION SENSING AND TRACKING IN A VEHICLE

INTRODUCTION

The subject disclosure relates to lane position sensing and tracking in a vehicle.

Vehicles (e.g., automobiles, trucks, construction equipment, farm equipment, automated factory equipment) increasingly include systems that augment or automate operation. Lane departure sensing augments vehicle operation by providing an indication to the driver when the vehicle fails to stay within the lane lines. Lane positioning may be part of autonomous or semi-autonomous vehicle operation and refers to actively keeping the vehicle within the lane lines. Both lane departure sensing and lane positioning require monitoring of the position of the vehicle with respect to the lane lines. Accordingly, it is desirable to provide lane position sensing and tracking in a vehicle.

SUMMARY

In one exemplary embodiment, a method of performing lane position sensing and tracking in a vehicle includes using a first camera with a first field of view of a first side of the vehicle and a second camera with a second field of view on a second side of the vehicle to capture images. The method also includes determining if a first lane line on a first side of the vehicle and a second lane line on the second side of the vehicle are both visible, and based on the first lane line and the second lane line being visible, determining, a position of the vehicle in a lane between the first lane line and the second lane line and determining a trajectory of the first lane line and the second lane line and of the vehicle.

In addition to one or more of the features described herein, the method also includes determining a distance between the first lane line and the second lane line as a width of the lane.

In addition to one or more of the features described herein, the method also includes, based on the first lane line and the second lane line not being visible, determining whether only one of the first lane line and the second lane line is a visible lane line.

In addition to one or more of the features described herein, the method also includes using the visible lane line and the width of the lane to determine if the vehicle is in the lane.

In addition to one or more of the features described herein, based on neither the first lane line nor the second lane line being visible, determining that an outage has occurred and tracking a duration of the outage.

In addition to one or more of the features described herein, the method also includes, based on the duration of the outage being less than a threshold duration, determining the position of the vehicle relative to the lane using the trajectory of the first lane line and the second lane line and of the vehicle, and, based on the duration of the outage being greater than a threshold duration, declaring that the position of the vehicle relative to the lane cannot be determined.

In addition to one or more of the features described herein, the determining the trajectory of the first lane line and the second lane line and of the vehicle includes using additional information, and the additional information includes a high definition map, information about a location of the vehicle, wheel speed sensors, an inertial measurement unit (IMU) of the vehicle, steering angle, or velocity of the vehicle.

In addition to one or more of the features described herein, based on neither the first lane line nor the second lane line being visible, determining the position of the vehicle relative to the lane using the trajectory of the first lane line and the second lane line and of the vehicle, and updating the trajectory of the first lane line and the second lane line and of the vehicle using the additional information.

In addition to one or more of the features described herein, the method also includes reporting the position of the vehicle relative to the lane for operation of a system of the vehicle.

In addition to one or more of the features described herein, the reporting the position of the vehicle relative to the lane is to a lane departure alerting system, or the reporting the position of the vehicle relative to the lane is to a lane positioning system.

In another exemplary embodiment, a system to perform lane position sensing and tracking in a vehicle includes a first camera with a first field of view of a first side of the vehicle, and a second camera with a second field of view on a second side of the vehicle. The first camera and the second camera are configured to capture images. The system also includes a processor to determine if a first lane line on a first side of the vehicle and a second lane line on the second side of the vehicle are both visible, and, based on the first lane line and the second lane line being visible, to determine a position of the vehicle in a lane between the first lane line and the second lane line and to determine a trajectory of the first lane line and the second lane line and of the vehicle.

In addition to one or more of the features described herein, the processor is further configured to determine a distance between the first lane line and the second lane line as a width of the lane.

In addition to one or more of the features described herein, based on the first lane line and the second lane line not being visible, the processor is further configured to determine whether only one of the first lane line and the second lane line is a visible lane line.

In addition to one or more of the features described herein, the processor is further configured to use the visible lane line and the width of the lane to determine if the vehicle is in the lane.

In addition to one or more of the features described herein, based on neither the first lane line nor the second lane line being visible, the processor is further configured to determine that an outage has occurred and to track a duration of the outage.

In addition to one or more of the features described herein, based on the duration of the outage being less than a threshold duration, the processor is further configured to determine the position of the vehicle relative to the lane using the trajectory of the first lane line and the second lane line and of the vehicle, and, based on the duration of the outage being greater than a threshold duration, the processor is further configured to declare that the position of the vehicle relative to the lane cannot be determined.

In addition to one or more of the features described herein, the processor is further configured to determine the trajectory of the first lane line and the second lane line and of the vehicle using additional information, and the additional information includes a high definition map, information about a location of the vehicle, wheel speed sensors, an inertial measurement unit (IMU) of the vehicle, steering angle, or velocity of the vehicle.

In addition to one or more of the features described herein, based on neither the first lane line nor the second lane line being visible, the processor is configured to determine the position of the vehicle relative to the lane using the trajectory of the first lane line and the second lane line and of the vehicle and to update the trajectory of the first lane line and the second lane line and of the vehicle using the additional information.

In addition to one or more of the features described herein, the processor is further configured to report the position of the vehicle relative to the lane for operation of a system of the vehicle.

In addition to one or more of the features described herein, the system is a lane departure alerting system or a lane positioning system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
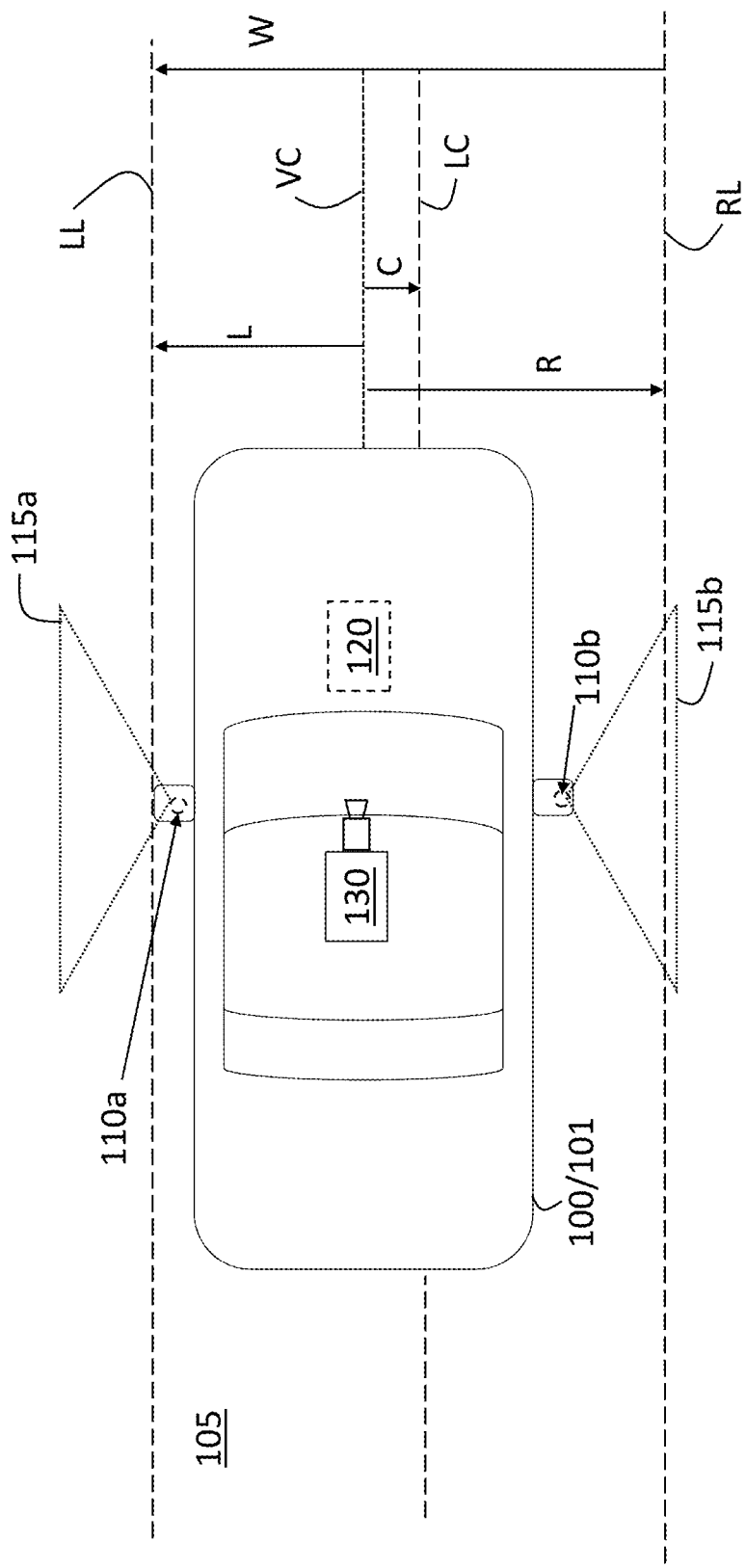
FIG. 1 is a block diagram of a vehicle with lane position sensing and tracking according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicle systems, including autonomous or semi-autonomous driving systems, may require the determination of the position of a vehicle within a lane. For example, a lane departure sensing system provides an alert to the driver if the vehicle is leaving the lane without an indication (e.g., turn signal) that the movement is purposeful. In an autonomous or semi-autonomous vehicle, a lane positioning system may control the vehicle to maintain its position in the lane. In existing vehicles, lane detection is typically based on a front camera module such as a camera placed behind the rearview mirror. Because the front camera module is a forward-looking sensor, the lane information obtained with the front camera module is error prone. That is, based on road curvature or the position of the vehicle within the lane, the view ahead of the vehicle may not accurately reflect the position of the vehicle within the lane. Also, because the front camera module involves a single camera, any blockage or malfunction can prevent any lane detection.

Embodiments of the systems and methods detailed herein relate to lane position sensing and tracking in a vehicle. Cameras that have been added to many vehicles for parking assistance may be used. For a 360 degree view during parking, four cameras and a processor, referred to as a video processing module, may be used. Two of those cameras are typically downward-looking cameras below the side mirrors. According to one or more embodiments, by additionally using these downward-looking cameras for lane position sensing, the current position of the vehicle relative to the lane lines may be detected rather than only the view ahead of the vehicle as in prior approaches. In addition, as further detailed, the lane dimensions and trajectory determined by using these cameras may be used for tracking when the lane lines themselves are not visible due to the position of the vehicle within the lane, for example.

In accordance with an exemplary embodiment, FIG. 1 is a block diagram of a vehicle with lane position sensing and tracking. The vehicle 100 shown in FIG. 1 is an automobile 101 in a lane 105. Two downward-looking cameras 110a, 110b (generally referred to as 110) are indicated as being located below the side-view mirrors. The corresponding fields-of-view 115a, 115b (generally referred to as 115) of these cameras 110 are also indicated. In the exemplary scenario depicted in FIG. 1, the vehicle 100 is closer to the left lane line LL than to the right lane line RL. This is clear by comparing the vehicle center line VC to the lane center line LC and noting that the vehicle center line VC is to the left of the lane center line LC. That is, the distance R from the vehicle center line VC to the right lane line RL is greater than the distance L from the vehicle center line VC to the left lane line LL.

The vehicle 100 includes one or more controllers 120 that determine the position of the vehicle 100 within the lane 105 according to one or more embodiments and implement, or communicate with other components that implement, systems like the lane departure alert or lane positioning. When both lane lines (LL and RL) are within a field of view 115, the controller 120 determines the position (e.g., distance) of the left lane line LL and the right lane line RL relative to the vehicle 100. The controller 120 then determines the width W of the lane 105 from this information. By additionally knowing the dimensions (e.g., width) of the vehicle 100, the controller 120 also determines the vehicle center line VC relative to the lane center line LC and the offset C between the two. The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The vehicle 100 may also include additional sources of information 130. The additional sources of information 130 may be other sensors (e.g., radio detection and ranging (radar) system, light detection and ranging (lidar system)). The additional sources of information 130 may be vehicle sensors (e.g., wheel speed sensors, the inertial measurement unit (IMU), steering angle sensor, vehicle velocity sensor) or information associated with mapping and locating systems such as a high definition map or recorded information about previously traveled roads. While the cameras 110, controller 120, and additional sources of information 130 are shown in particular locations in FIG. 1, they may be located elsewhere in or on the vehicle 100 according to alternate embodiments. For example, wheel speed sensors and other additional sources of information 130 are required to be in particular areas of the vehicle 100 while other additional sources of information 130 may be arranged anywhere within the vehicle 100. All of the additional sources of information 130 are well-known and not detailed herein. The cameras 110, for example, may be located farther ahead (e.g., near the front tires) or behind (e.g., near the rear tires) their location below the side mirrors. Their fields of view 115 below and to the side of the vehicle 110 is relevant to the lane detection according to one or more embodiments.

Figure 2:
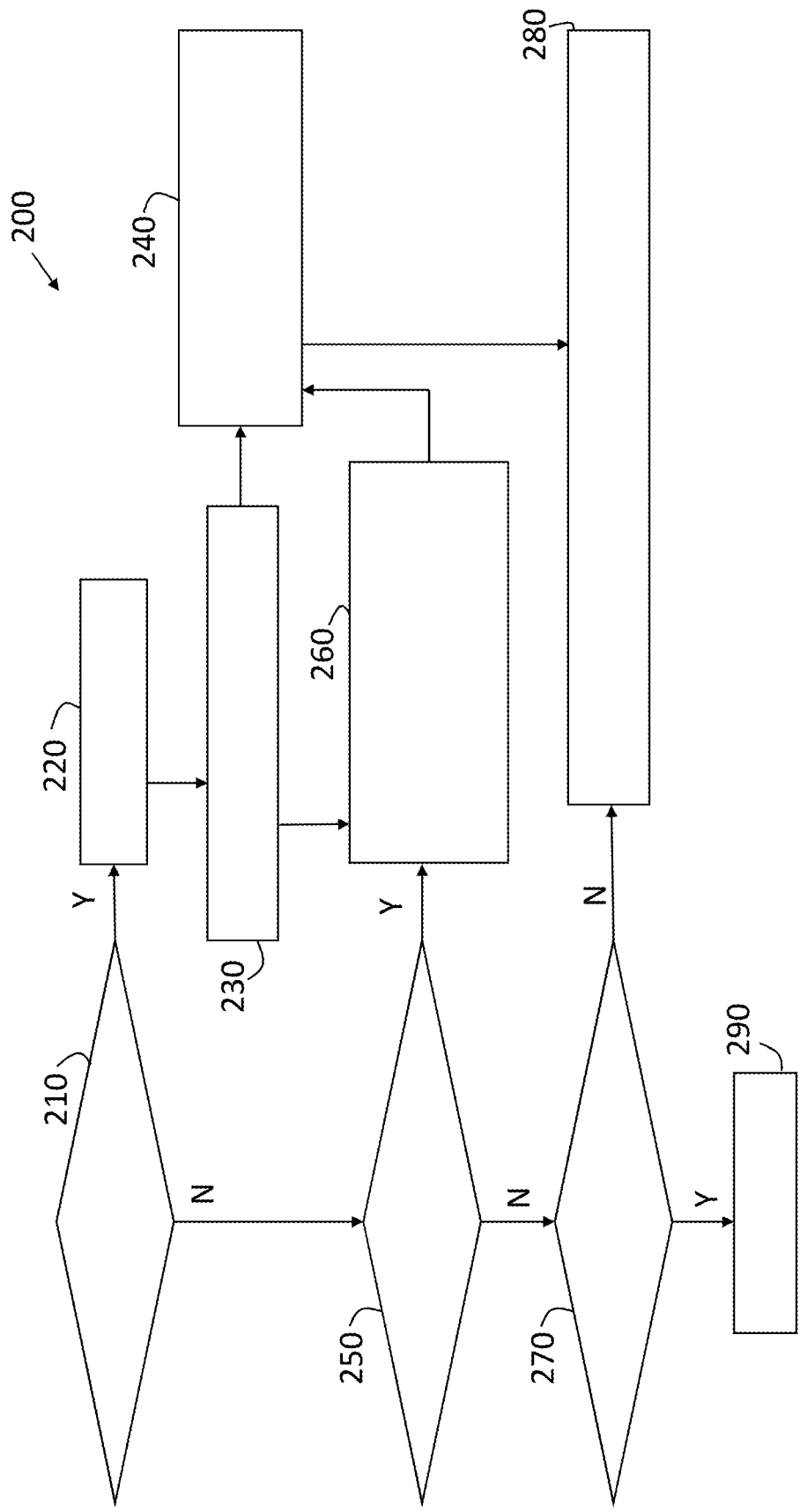
FIG. 2 is a process flow of a method of performing lane position sensing and tracking in a vehicle according to one or more embodiments.

FIG. 2 is a process flow 200 of a method of performing lane position sensing and tracking in a vehicle according to one or more embodiments. The processes shown in FIG. 2 may be performed continuously or may be triggered by an event (e.g., vehicle exceeding a threshold speed, lane positioning system engaged, hands-free driving engaged) or other prompt (e.g., vehicle location). At block 210, a check is done of whether both lane lines RL, LL are visible. If they are, then a determination is made, at block 220, that the vehicle 100 is in the lane 105. This information may be provided to the lane departure system or any other functionality that requires knowledge of the position of the vehicle 100 relative to the lane 105. Thus, no lane departure alert is needed and lane positioning is not needed. Presumably, both lane lines RL, LL are visible at some point. In this case, in addition to determining that the vehicle 100 is in the lane 105 (at block 220), determining lane dimensions, at block 230, and tracking the trajectory 310 (FIG. 3) of the lane and the trajectory 320 (FIG. 3) of the vehicle 100 within the lane 105 is performed, at block 240.

At block 230, determining the lane dimensions refers to determining the values discussed with reference to FIG. 1. To be clear, the dimensions of the vehicle 100, the position of the cameras 110 on the vehicle, and the distances from the vehicle associated with areas within the field of view 115 of each camera 110 are known. Using this information, the values that are determined include the distances R and L from the right lane line RL and the left lane line LL, respectively, and the width W of the lane 105 (i. e., the distance between the lane lines RL and LL). These values indicate not only that the vehicle 100 is within the lane lines RL and LL but also the position of the vehicle 100 within the lane lines RL and LL. That is, knowing the vehicle center line VC and determining a lane center line LC based on the width W), the offset C between the vehicle center line VC and the lane center line LC can also be determined from the geometry shown in FIG. 1. The algebraic formulas used to obtain the dimensions discussed herein (e.g., C=position of the vehicle center line VC−position of the lane center line LC) are straight-forward and not detailed herein. At block 240, tracking the trajectory 310 of the lane 105 and the trajectory 320 of the vehicle 100 within the lane 105 refers to monitoring the curvature of the lane 105 and the movement of the vehicle 100 within the lane 105. This is further discussed below.

Based on the check at block 210, if both lane lines RL, LL are not visible, then a check is done, at block 250, of whether one lane line RL or LL is visible. If it is, then the process flow 200 includes using the lane dimensions (determined at block 230 when both lane lines RL and LL were visible) to determine vehicle position in the lane 105, at block 260. One of the lane lines RL or LL may not be in the field of view 115 of a camera 110 for a number of reasons. For example, the vehicle may be too close (e.g., within tens of centimeters) of the lane line RL or LL. One of the cameras 110 may be blocked or not operating properly. In any case in which only one lane line RL or LL is visible, the controller 120 determines the position of the vehicle 100 relative to the lane 105 based on the distance to the visible lane line RL or LL and on knowledge of the width W of the lane 105 and the width of the vehicle 100. The controller 120 may report the information, as needed, to other controllers or systems of the vehicle. As indicated in FIG. 2, the tracking of the lane trajectory 310 and the trajectory 320 of the vehicle 100 within the lane 105 may continue based on the visible lane line RL or LL.

As indicated in FIG. 2, block 240 is reached when both lane lines RL and LL are visible (at block 210) or when one lane line RL or LL is visible (at block 250). In those cases, one or both lane lines RL, LL are used to track the lane trajectory 310. The lane trajectory 310 may be additionally determined or refined based on additional sources of information 130 such as a high definition map or prior recording of information at the same location, for example. The vehicle trajectory 320 may be determined based on additional sources of information 130 such as wheel speed sensors, the inertial measurement unit (IMU) of the vehicle 100, the steering angle, vehicle velocity, and the like. When this additional information is available, lane trajectory 310 and vehicle trajectory 320 may be tracked even when neither lane line RL, LL is visible.

Based on the check at block 250, if even one lane line RL or LL is not visible, then the process flow 200 includes using trajectories (maintained at block 240) to determine the vehicle position in the lane 105, at block 280, based on a check at block 270. The process at block 280 assumes that an outage of information about both lane lines RL, LL is brief (i.e., on the order of seconds) or that lane trajectory 310 and vehicle trajectory 320 are tracked even without a visible lane line RL, LL because of additional information (e.g., high definition map, IMU). When additional information needed to continue to track lane trajectory 310 and vehicle trajectory 320 is not available, an assumption is made that both the curvature of the lane 105 (i.e., its trajectory 310) and the trajectory 320 of the vehicle 100 within the lane 105 will be unchanged (from the information determined when lane lines RL, LL were visible) over the distance that the vehicle 100 might travel in that time.

At block 270, a check is done of whether the duration of the outage of both cameras 110 exceeds a threshold duration in the case when lane trajectory 310 and vehicle trajectory 320 cannot be updated during a lane line outage. If the duration of the outage exceeds the threshold duration, then the controller 120 declares an outage, at block 290. This can be an internal decision that lane position information cannot be provided or can include a notification to systems (e.g., lane positioning system) that rely on the lane position information. If the duration of the outage of both cameras 110 has not been exceeded (as determined at block 270), then the trajectories 310, 320 are used to continue to determine the position of the vehicle 100 relative to the lane 105.

It bears noting that the lane 105 is not one specific lane but any lane 105 in which the vehicle 100 travels. Thus, in the case of a lane change, a lane line RL or LL will temporarily be out of the field of view 115 of a camera 110. For example, if the lane change is to the left, the right side camera 110 will not detect the right lane line RL at some point during the lane change. After the lane change into the left lane 105, the new right lane line RL will be the former left lane line LL (i.e., prior to the lane change) and the new left lane line LL will be one that was not visible prior to the lane change.

Figure 3:
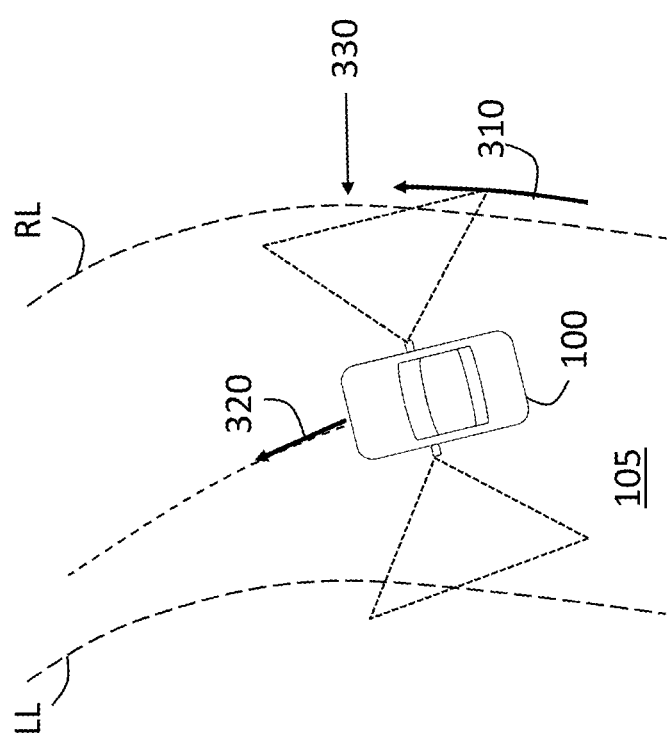
FIG. 3 illustrates lane position tracking according to one or more embodiments.

FIG. 3 illustrates lane position tracking (at block 240, FIG. 2) according to one or more embodiments. A vehicle 100 is shown in a lane 105. Based on the movement of the vehicle 100 and assuming that the right lane line RL and the left lane line LL have been visible up to the position shown, the trajectory 310 of the lane 105 and the trajectory 320 of the vehicle 100 are determined at block 240. Based on the process at block 240, the lane trajectory 310 and the vehicle trajectory 320 are known, along with the position of the vehicle 100 in the lane 105, until the time that both lane lines RL and LL are no longer visible. By assuming that the lane trajectory 310 and the vehicle trajectory 320 do not change for a brief duration (on the order of seconds depending on vehicle speed), the position of the vehicle 100 in the lane 105 can be determined (at block 280, FIG. 2) over that duration by advancing the vehicle 100 along the vehicle trajectory 320. The relative position of the vehicle 100 to the lane 105 will then be based on the lane trajectory 310 over that same duration. As previously noted, if additional information is available (e.g., high definition map, steering angle), then the lane trajectory 310 and vehicle trajectory 320 may be updated even when both lane lines RL and LL are not visible and the duration for which lane position is performed according to the process at block 280 need not be limited.

Thus, in the exemplary scenario shown in FIG. 3, if both lane lines RL and LL are no longer visible and no additional information is available after the position shown in the figure, then the indicated vehicle trajectory 320 and lane trajectory 310 are used (i.e., maintained for a given duration) to determine the position of the vehicle 100 in the lane 105 during and at the end of that duration. A threshold duration may be set, based on the speed of the vehicle 100, after which the controller 120 declares that lane position determination is not possible (at block 270) until lane lines RL or LL are visible again. That is, at a relatively slow speed and based on optionally available high definition map information, for example, a longer duration of outage for both cameras 110 may be tolerated than at a relatively high speed with no additional information about lane trajectory 310.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of performing lane position sensing and tracking in a vehicle, the method comprising:
   using a first camera with a first field of view of a first side of the vehicle and a second camera with a second field of view on a second side of the vehicle to capture images;
   determining, using a processor, if a first lane line on a first side of the vehicle and a second lane line on the second side of the vehicle are both visible;
   based on determining that the first lane line and the second lane line are both visible, determining, using the processor, a position of the vehicle in a lane between the first lane line and the second lane line and determining a trajectory of the first lane line and the second lane line and of the vehicle; and
   based on determining that neither the first lane line nor the second lane line is visible, determining the trajectory of the first lane line and the second lane line and of the vehicle using additional information that does not include the first lane line and the second lane line, and determining the position of the vehicle relative to the lane using the trajectory of the first lane line and the second lane line and of the vehicle.

2. The method according to claim 1, further comprising determining a distance between the first lane line and the second lane line as a width of the lane.

3. The method according to claim 2, further comprising, based on determining that the first lane line and the second lane line are not both visible, determining whether only one of the first lane line and the second lane line is a visible lane line.

4. The method according to claim 3, further comprising using the visible lane line and the width of the lane to determine if the vehicle is in the lane.

5. The method according to claim 1, wherein, based on neither the first lane line nor the second lane line being visible, determining that an outage has occurred and tracking a duration of the outage.

6. The method according to claim 5, further comprising, based on the duration of the outage being less than a threshold duration, determining the position of the vehicle relative to the lane using the trajectory of the first lane line and the second lane line and of the vehicle, and, based on the duration of the outage being greater than a threshold duration, declaring that the position of the vehicle relative to the lane cannot be determined.

7. The method according to claim 1, wherein the additional information includes a high definition map, information about a location of the vehicle, wheel speed sensors, an inertial measurement unit (IMU) of the vehicle, steering angle, or velocity of the vehicle.

8. The method according to claim 7, wherein, based on neither the first lane line nor the second lane line being visible, updating the trajectory of the first lane line and the second lane line and of the vehicle using the additional information.

9. The method according to claim 1, further comprising reporting the position of the vehicle relative to the lane for operation of a system of the vehicle.

10. The method according to claim 9, wherein the reporting the position of the vehicle relative to the lane is to a lane departure alerting system, or the reporting the position of the vehicle relative to the lane is to a lane positioning system.

11. A system to perform lane position sensing and tracking in a vehicle, the system comprising:
    a first camera with a first field of view of a first side of the vehicle;
    a second camera with a second field of view on a second side of the vehicle, wherein the first camera and the second camera are configured to capture images; and
    a processor configured to determine if a first lane line on a first side of the vehicle and a second lane line on the second side of the vehicle are both visible, based on determining that the first lane line and the second lane line are both visible, to determine a position of the vehicle in a lane between the first lane line and the second lane line and to determine a trajectory of the first lane line and the second lane line and of the vehicle, based on determining that neither the first lane nor the second lane is visible, to determine the trajectory of the first lane line and the second lane line and of the vehicle using additional information that does not include the first lane line and the second lane line, and to determine the position of the vehicle relative to the lane using the trajectory of the first lane line and the second lane line and of the vehicle.

12. The system according to claim 11, wherein the processor is further configured to determine a distance between the first lane line and the second lane line as a width of the lane.

13. The system according to claim 12, wherein, based on determining that the first lane line and the second lane line are not both visible, the processor is further configured to determine whether only one of the first lane line and the second lane line is a visible lane line.

14. The system according to claim 13, wherein the processor is further configured to use the visible lane line and the width of the lane to determine if the vehicle is in the lane.

15. The system according to claim 11, wherein, based on neither the first lane line nor the second lane line being visible, the processor is further configured to determine that an outage has occurred and to track a duration of the outage.

16. The system according to claim 15, wherein, based on the duration of the outage being less than a threshold duration, the processor is further configured to determine the position of the vehicle relative to the lane using the trajectory of the first lane line and the second lane line and of the vehicle, and, based on the duration of the outage being greater than a threshold duration, the processor is further configured to declare that the position of the vehicle relative to the lane cannot be determined.

17. The system according to claim 11, wherein the additional information includes a high definition map, information about a location of the vehicle, wheel speed sensors, an inertial measurement unit (IMU) of the vehicle, steering angle, or velocity of the vehicle.

18. The system according to claim 17, wherein, based on neither the first lane line nor the second lane line being visible, the processor is configured to update the trajectory of the first lane line and the second lane line and of the vehicle using the additional information.

19. The system according to claim 11, wherein the processor is further configured to report the position of the vehicle relative to the lane for operation of a system of the vehicle.

20. The system according to claim 19, wherein the system is a lane departure alerting system or a lane positioning system.

* * * * *